United States Patent [19]

Dahl

[11] 4,348,141

[45] Sep. 7, 1982

[54] HOLLOW EXTERNALLY THREADED FASTENERS HAVING GREATLY INCREASED DUCTILITY

[76] Inventor: Norman C. Dahl, 40 Fern St., Lexington, Mass. 02173

[21] Appl. No.: 95,166

[22] Filed: Nov. 19, 1979

[51] Int. Cl.³ .................... F16B 35/00; F16B 31/02
[52] U.S. Cl. ................... 411/389; 10/27 R; 29/407; 411/392; 411/395; 411/424
[58] Field of Search ............ 411/424, 411, 395, 382, 411/381, 378, 389, 388, 8, 1, 14, 392; 10/27 R, 10 R; 29/407

[56] References Cited

U.S. PATENT DOCUMENTS

| | | | |
|---|---|---|---|
| 1,054,669 | 3/1913 | Bowen | 72/349 |
| 1,131,342 | 3/1915 | Dodds | 411/382 |
| 1,135,695 | 4/1915 | Kennedy | 411/418 |
| 1,162,746 | 12/1915 | Bowen | 411/395 X |
| 2,006,276 | 6/1935 | Nodiere | 411/392 |
| 2,168,000 | 8/1939 | Schaurte | 411/392 |
| 4,083,393 | 4/1978 | Okada | 411/267 |

FOREIGN PATENT DOCUMENTS

| | | | |
|---|---|---|---|
| 897091 | 3/1944 | France | 411/424 |
| 47-45976 | 11/1972 | Japan | 411/424 |
| 351428 | 12/1929 | United Kingdom | 411/424 |
| 497201 | 1/1939 | United Kingdom | 411/392 |
| 120088 | 8/1958 | U.S.S.R. | 411/392 |

Primary Examiner—Ramon S. Britts
Attorney, Agent, or Firm—Richard P. Crowley

[57] ABSTRACT

A metal fastener having a well-defined yield point and improved elongation beyond the yield point and a tensile strength (force) at least as large as the specified minimum for the grade, size, and threads of said metal fastener, the metal fastener of nominal diameter D, which metal fastener comprises in combination: an externally threaded component having threads of nominal diameter D; a circular, cylindrical shank component having a diameter $D_S$ equal to or substantially equal to said nominal diameter D extending axially to one end of the threaded component; and a head component for the application of torque to the fastener extending axially to the other end of the shank component; the fastener being characterized by an axially extending hollow cavity positioned therein within the shank component, and not extending substantially into the threaded component, the maximum cross-sectional area of the hollow cavity in the shank component being greater than the minimum cross-sectional area within any part of the hollow cavity which extends into the head or threaded components.

46 Claims, 11 Drawing Figures

PRIOR ART REGULAR BOLT
$R_c = 36.0$

DUCTBOLT
$A_r = .924 A_s$
$L_r = 6.4\sqrt{A_r}$
$R_c = 34.6$

HOLLOW EXTERNALLY THREADED FASTENERS HAVING GREATLY INCREASED DUCTILITY

BACKGROUND OF THE INVENTION

In recent years there have been major changes in the use of fasteners. One of these changes has been a shift to the use of high strength bolts and studs. Although these cost more per fastener than lower strength bolts or studs of the same size the overall cost of the completed joint is reduced. This lower cost results because fewer or smaller high strength fasteners are required and because design and manufacturing changes in the joint components become possible when fewer or smaller fasteners are used, leading to further cost savings.

Another significant change in fastener use has been the increasing acceptance by industry of the practice of tightening bolts in the plastic range, tightening them until they yield. This acceptance has been prompted by two advantages which accrue from tightening to yield. First, the tensions produced in the bolts are much more uniform than the tensions obtained when bolts are tightened within the elastic range because of the much greater influence that variation in the friction conditions has on the tensions of bolts tightened within the elastic range. Second, tightening bolts into the plastic range utilizes the maximum possible strength of the bolt and thus allows the use of smaller bolts or fewer bolts of the same size.

There are three conditions which must be well controlled if tightening bolts to yield is to produce satisfactory results. First, the yield points of the bolts as manufactured must be kept within a specified range of tension variation. Second, the wrenching system must be capable of identifying accurately the yield point of each bolt so that the tightening can be halted when yield is reached. Third, care must be taken that no bolt is tightened into the plastic range so far that either the bolt breaks during tightening or the beginning of fracture is initiated at some point within the bolt with the result that the bolt breaks later when the equipment is in service.

Several wrenching systems have been developed for tightening bolts to yield. Angle control wrenching systems, also called turn-of-the-nut systems, operate by tightening the bolt through a specified angle which is large enough to bring the bolt into the plastic region but not so large there is danger that the bolt will break or that the beginning of fracture will be initiated.

Other wrenching systems make use of the fact that the torque required to tighten a bolt is proportional to the tension existing in the bolt and, therefore, the shape of the torque-rotation curve is proportional to the shape of the tension-rotation curve. Such wrenching systems incorporate transducers which measure torque and angle of tightening rotation, and a small on-board computer continuously monitors the outputs of these transducers and computes the torque-rotation gradient (slope). Tightening to yield is accomplished by programming the computer to stop tightening when the torque-rotation slope has dropped to some fraction (say, two-thirds) of the slope computed during the elastic tightening phase.

Angle control wrenching systems work relatively well with low strength bolts because these bolts have a relatively large ductility; that is, after beginning to yield plastically during tightening these bolts can be rotated through a relatively large angle before fracture occurs. This large ductility allows the low strength bolt to be tightened through a specified angle certainly large enough to bring the bolt tension beyond the beginning of plastic yield but not so large as to bring it to the point of maximum tension.

However, these angle control wrenching systems work less well with high strength bolts. These bolts have limited ductility and this means the specified angle through which the bolt is rotated cannot be large. Also, high strength bolts do not have a sharp yield point and this leads to uncertainty as to the minimum limit to be put on the specified angle of rotation, a situation complicated by the fact that the compression stiffnesses of the joint components must be taken into account.

Continuously monitoring torque-rotation gradient wrenching systems work relatively well with low strength bolts. The large ductility of these bolts allows the tightening to be stopped when the torque-rotation slope has dropped to a relatively small fraction (say, one-third) of the elastic tightening phase slope without danger that the point of maximum tension has been reached. Being able to program the wrench to stop tightening at a smaller fraction of the elastic tightening phase of the torque-rotation slope enhances the accuracy of the preload tensions obtained because of two factors. First, a point of lower slope in the torque-rotation curve also is a point of lower slope in the tension-rotation curve and thus variations in the rotation angle at which tightening is stopped lead to smaller variations in the preload tension. Second, a point at which the torque-rotation slope is a large fraction of the elastic tightening phase slope is harder to identify correctly because the stick-slip nature of friction behavior causes random variations in individual torque readings and these lead to variations in torque-rotation increments which might be interpreted mistakenly as changes in the slope itself, the effect of this being greater the smaller the difference between the elastic slope and the target slope. This difficulty is reduced by "smoothing" of the torque-rotation data, but slope measurement errors remain to cause variation in the preload tensions obtained.

The preload tensions produced in high strength bolts by continuously monitoring torque-rotation gradient wrenching systems are subject to greater variation because of the random data variations discussed above. Because these bolts have limited ductility and do not have a sharp yield point the target slope for stopping tightening must be a relatively large fraction of the elastic tightening phase slope. Additional fluctuations in the preload tensions result from variations in the hardness of manufactured bolts. The allowable hardness variation specified for high strength bolts means that the tensile strength, and thus the yield strength, can vary over a considerable range, by as much as 15 to 20%.

I previously have invented and patented a process for reducing the range of variation in preload tensions produced in high strength bolts tightened to yield by a continuously monitoring torque-rotation gradient wrenching system. This process, which is set forth in my U.S. Pat. Nos. 4,035,858 and 4,078,273, consists of adding to the manufacturing process a step which consists of work hardening each bolt by subjecting it to a tensile force of given magnitude. The bolts so treated all will have the same yield point level irrespective of their individual hardnesses and, further, when being tightened each bolt will have a discontinuity in the slope of its torque-rotation curve at the same level of preload tension. There will be a corresponding discontinuity in the slope of the torque-rotation curve which a continuously monitoring torque-rotation gradient wrenching system will be able to detect with accuracy.

One deficiency with my pre-use work hardening process of U.S. Pat. Nos. 4,035,858 and 4,078,273 is that it adds a relatively complicated step to the manufacturing process and thus increases the cost of the bolts. A second deficiency is that this process does not increase the ductility of high strength bolts. An increase in the bolt ductility would allow the use of a larger maximum angle limit for the specified angle employed by angle control wrenching systems and, also, permit a greater number of reuses of a bolt tightened to yield.

Because of these deficiencies I began to search for a more economical way to provide high strength fasteners with a definite yield point and, at the same time, increase their ductility substantially. As will be evident from the following description of my invention I have been successful in this search.

SUMMARY OF THE INVENTION

My invention relates to improved metal threaded fasteners such as threaded bolts, cap screws, or studs and to processes of manufacturing and tightening such fasteners. In particular, my invention concerns an externally threaded fastener incorporating a portion in which the axially transverse cross sectional area of the metal is reduced below the stress area of the threads of the threaded part of the fastener, with this portion of reduced area being designed such that if the fastener is tightened until it fractures the failure will occur in the portion of reduced area rather than in the threaded part or in any other part of the fastener. My invention also discloses how this portion of reduced area can be further designed so that when the fastener is tightened to yield the preload tension produced in the fastener is substantially the same as the preload tension produced in a prior art regular fastener of conventional design having the same functional arrangement, nominal diameter, and overall length when the regular fastener is tightened to yield under the same tightening conditions.

Fasteners made according to my invention have unexpected behavior. Most important, bolts of my design—which I shall call Ductbolts for ease of reference—have plastic deformation characteristics quite different from those of regular bolts. One significant difference is that when the metal in the manufactured bolt has a sharp yield point the Ductbolt can be designed to have a well defined yield point, in contrast to the gradually increasing plastic deformation of a regular bolt made of the same metal. Another difference is that the Ductbolt has much more ductility than a regular bolt . . . of the magnitude, depending on the bolt metal and the particular design, of as much as two or more times the ductility of prior art regular bolts. Moreover, despite its portion with reduced area the the Ductbolt can be designed to produced preload tensions equal to the tension produced in a prior art regular bolt tightened to yield.

The well defined yield point of the Ductbolt ensures that continuously monitoring torque-rotation gradient wrenching systems will have little difficulty in tightening Ductbolts accurately to the beginning of yield. This means that the percentage variation in the preload tensions produced in Ductbolts will be about the same as the percentage variation in the yield points of the Ductbolts as manufactured. Thus, Ductbolts will produce substantially more uniform preload tensions than will regular bolts.

The combination of well defined yield point and greatly increased ductility means that angle control wrenching systems will work well with high strength Ductbolts. Further, the tension in the Ductbolt increases only slowly with tightening beyond the yield point and hence angle control systems will produce nearly as uniform preload tensions as will continuously monitoring systems. This can lead to significant savings in wrenching system investment since angle control systems can be much simpler and and therefore less expensive than continuously monitoring torque-rotation gradient systems.

The greater ductility also allows the Ductbolt to be reused substantially more than the number of re-uses possible for regular bolts tightened to yield. Also, as will be described later, the Ductbolt can be designed so that it gives clear visual indication of when it no longer can be reused safely.

When equipment assembled with Ductbolts must be repaired in the field even relatively inexperienced mechanics using an ordinary hand wrench and the turn-of-the-nut method can tighten a Ductbolt to the same preload tension it carried when the equipment originally was assembled in the factory with a sophisticated wrenching system. This is possible because of the Ductbolt's combination of well defined yield point and large ductility.

The fact that Ductbolts can be tightened accurately to yield by inexperienced mechanics is a significant advantage. No manufacturer of equipment will go to the additional expense of purchasing sophisticated wrenching systems so bolts can be tightened to yield unless the satisfactory performance of the equipment requires that the bolts be tightened to yield. As a consequence, when the equipment must be repaired it will be mandatory that the bolts again be tightened to yield. Because regular bolts have no definite yield point and only limited ductility, only a very skilled mechanic or a sophisticated wrench can ensure that when the equipment is reassembled these bolts will be tightened to yield and yet not overtightened to the point where fracture has been initiated.

Where the volume of equipment repair is high, for example in the repair shop of a large automobile dealer, it will make economic sense to have a sophisticated wrench on hand. But in the majority of cases equipment is dispersed, its failure is intermittent and unpredictable, and repair must be done at the equipment site. In these situations the cost of sophisticated wrenches will preclude their being on hand, and if regular bolts have been used in original assembly and a skilled mechanic is not present the equipment reassembly will have to await the arrival of a sophisticated wrench. If Ductbolts have been used in original assembly there will be no delay or difficulty in reassembling equipment after repair, even in remote field sites.

The reduced area portion of the Ductbolt can be created by cold forming methods such as are used to give shape to regular bolts. In most cases this will involve having a cold forming machine with one or two more stations than are used for making regular bolts. Since the production rate will be unchanged the incremental cost of forming the Ductbolt will be substantially only the amortized die and capital costs for the extra stations.

Counteracting this cost increment will be the cost reduction which will come as a consequence of the steel volume saved due to the reduced portion of the Ductbolt. Expressed as a percentage of the steel volume in a regular bolt, the steel saving can range from about 8 percent for a high strength bolt whose length is 4 times the nominal diameter to about 20 percent for a bolt 10 diameters in length. For low strength bolts the steel saving can be about twice these values.

The lighter weight of the Ductbolt will give it an additional competitive advantage for some applications, for example in aircraft and space vehicles, and perhaps in the automotive industry where every effort is being made to save weight in order to reduce gasoline comsumption.

This behavior of the Ductbolt, which differs so radically from that of a regular bolt, is a direct consequence of the basic concept underlying my invention. The evolution of this concept began with my observation that many of the medium carbon alloy steels used to make high strength bolts have inherent material properties of sharp yield point and large ductility, ductility of the same order as that of the low carbon steels used to manufacture low strength bolts. This observation led me to ask: Why are these inherent material properties of these alloy steels not displayed in the behavior of regular high strength bolts? Investigation of this question informed me that, in fact, these material properties of sharp yield point and large ductility are displayed in the behavior of high strength bolts, but they are displayed in only a small volume of the bolt's metal and in such manner that their existence is not evident in the bolt's overall deformation behavior.

In a regular bolt or stud the metal adjacent to the root of the threads is the most highly stressed. The bolt is of minimum diameter here and the notched shape of the thread at its root produces stress concentration to further increase the stress level. When the bolt tension increases to the level where yielding begins in this region of highest stress the amount of metal which undergoes yielding initially is very small, at any point along the spiraling thread being limited to a localized volume around the thread root because the stresses near a notch decrease rapidly with distance from the notch. As a consequence, even though the metal around the thread begins to yield with a sharp yield point the total deformation of this metal will be very little because the volume of yielded metal is small. The spiral nature of the thread complicates the situation further by requiring deformation of the unyielded metal away from the thread root in order for the plastic deformation of the yielded metal to be translated into axial plastic elongation of the bolt. The result is that the overall axial deformation of a regular bolt in either a tensile test or in the process of being tightened is a smooth transition from elastic to plastic elongation even though the metal at the root of the thread begins to yield abruptly.

The limited overall ductility of a regular bolt, i.e. the limited overall axial elongation from the beginning of plastic yielding to the point of fracture, also results from the fact that the most highly stressed metal is adjacent to the thread. The notched shape of the thread induces a triaxial state of stress in this region and triaxial tension reduces the plastic strain that ductile metals can undergo before fracture is initiated. The deformation restraint imposed by the spiral nature of the thread geometry, discussed above, further reduces the overall axial plastic elongation. The combination of these two effects results in the limited overall axial ductility exhibited by regular bolts.

Out of this understanding of the interplay between the inherent plastic stress-strain behavior of the bolt metal and the overall axial deformation of a regular bolt there evolved the basic concept which underlies my invention. I reasoned that I could produce bolts with radically different overall axial elongation behavior by adopting the following design concept: the typical failure of bolts in their threaded portion should be preempted by designing the bolt such that failure during tightening always occurs in another portion of the bolt in a mode of failure which permits the inherent plastic yield and ductility properties of the bolt metal to be substantially fully exhibited in the overall axial deformation of the bolt, and also making the design such that when the bolt is tightened to yield the preload tension will be substantially the same as the preload tension in a prior art regular bolt tightened to yield. Through theory and experiment I have utilized this concept to arrive at specific designs which combine geometric shape, particular dimensions, and material properties to give the Ductbolt the unique behavior described above.

BRIEF DESCRIPTION OF THE DRAWINGS

FIG. 5 displays torque and tension data taken in a tightening test of a ⅜ in.-16 grade 8 prior art regular bolt of core hardness Rockwell C 36.0 for which the length between the bolt head and the nut was 2.74 in.

DESCRIPTION OF THE PREFERRED EMBODIMENT

As described earlier, the basic concept of my invention is to design the Ductbolt such that the inherent plastic yield and ductility properties of the bolt metal are substantially fully exhibited in the overall axial elongation of the bolt. A practical economic constraint on the design is that when the Ductbolt is tightened to yield the bolt tension must be substantially the same as the tension produced in a prior art regular bolt tightened to yield.

In order for the inherent plastic yield and ductility properties of the bolt metal to be substantially fully exhibited in the overall axial elongation of the bolt when it is being tightened it is necessary that an appreciable length of the bolt outside of the threaded region must be the most highly stressed region in the bolt, and the form of the bolt over this length must be such that the stress gradients of the axial stress are small and there is little triaxiality of stress. These conditions will be produced by a design in which a nonthreaded portion of the bolt has an axially transverse cross section of metal which varies only gradually in shape or area over the length of the portion and the area of the metal is less than the stress area of the threads, $A_s$.

The stress area of the threads is that area which when multiplied by the inherent tensile strength (stress) of the bolt metal gives the tensile strength (force) measured in a tensile test of the bolt. Since a thread is formed in a spiral the stress area does not lend itself to precise analytical definition and the definition has been made on an empirical basis. (See *Society of Automotive Engineers Handbook*, 1979, SAE Standard J429j, Mechanical and Material Requirements for Externally Threaded Fasteners, Table 5, page 5.05, and SAE Standard J1199, Mechanical and Material Requirements for Metric Externally Threaded Fasteners, Table 5, page 5.10.)

When the axially transverse cross section varies only gradually in shape or area over the length of this reduced portion the axial stress due to the tension will be substantially uniform throughout the portion and there will be no hinderance to the local axial strains in adding cumulatively to produce overall axial elongation of the bolt. In the reduced portion the torsional shear stress due to the tightening torque will vary with radial position; this shear stress will influence the amount of plastic deformation but will not disturb the distribution of axial stress or strain.

Figures 1A, 1B:
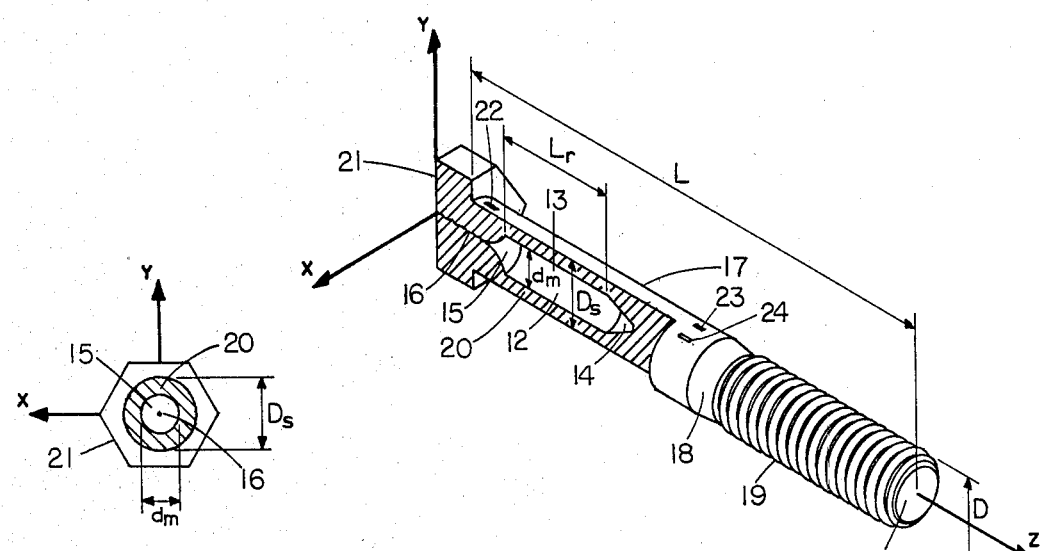
FIG. 1a is an isometric view of a Ductbolt incorporating the preferred embodiment of my invention in which the portion of reduced metal area is of axial length $L_r$ and this reduced area is created by the presence of a closed hollow cavity positioned within the shank component of the bolt.
FIG. 1b depicts an axially transverse cross sectional view of the Ductbolt of FIG. 1a, the cross section being made in the portion of reduced metal area.

A Ductbolt incorporating this kind of portion with reduced metal area is shown in FIG. 1a. The Ductbolt 11 of nominal diameter D is comprised, in axial sequence, of a head component 21, a shank component 17 of diameter $D_s$, a transition 18, and a threaded component 19. Within the shank component 17 there is positioned a closed hollow cavity 12 comprised of a first transition portion 14, a middle portion 13 of axial length $L_r$ communicating axially with the first transition portion 14, and a second transition portion 15 communicating axially with the other end of the middle portion 13. The middle portion 13 of the cavity is of constant diameter $d_m$ along the axial length $L_r$ and is coaxial with the axis of the bolt.

The line 16 extending axially from the end of the second transition portion 15 to the outer surface of the head component 21 represents the coming together of the metal during the cold forming of the bolt. In order to make the closed hollow cavity 12 by cold forming it will be necessary to first make an open hollow cavity in the bolt metal. Subsequently, during forming of the head component 21 the metal will be brought together along the line 16 in a sealing relationship which transforms this open hollow cavity into the closed hollow cavity 12.

At any axial position in the shank component 17 the axially transverse cross sectional area $A_r$ of the metal in the shank is given by $$A_r = (\pi D_s^2/4) - A_c \tag{A}$$

where $A_c$ is the axially transverse cross sectional area of the hollow cavity at that position.

In the portion 20 of the shank component 17 coterminous with the cavity middle portion 13 the axially transverse cross sectional area $A_r$ of the metal in the shank is made sufficiently less than the stress area $A_s$ of the threads in the threaded component 19 so that fracture during tightening always will occur in this portion of the shank. This portion 20 of the shank will be referred to as the reduced portion.

Since $A_r$ within the reduced portion is made small enough so that fracture always occurs in this portion, it follows from Equation (A) that the maximum axially transverse cross sectional area $A_{cmax}$ of the closed hollow cavity occurs within the middle portion 13 of the cavity.

The purpose served by the marks 22, 23, and 24 in FIG. 1a will be made clear by reference to FIG. 2. The Ductbolt is designed so that the reduced portion 20 will undergo combined plastic axial elongation and plastic twisting while the bolt 11 is being tightened to yield. Each time the bolt is reused, i.e. again tightened to yield, there will be further plastic deformation of combined axial elongation and twist of the reduced portion 20. For any given design of Ductbolt the bolt manufacturer by experiment can determine the amount of plastic deformation the reduced portion 20 can undergo without danger that the portion will fail under service conditions. The marks 22 and 23 are aligned parallel to the axis of the bolt. The mark 24 is angularly positioned relative to mark 23 such that when the sight line $\overline{mn}$ between marks 24 and 22 is parallel to the axis of the bolt the bolt has undergone this safe amount of deformation. The user will continue to reuse the bolt until the sight line between the marks 24 and 22 is parallel to the bolt axis and at this point will discard the bolt. Also, the fraction of safe deformation remaining to be used after the bolt has been tightened an unknown number of times can be estimated by laying a straightedge through mark 22 and parallel to the bolt axis and scribing the position of the straightedge on the shank surface between marks 23 and 24. The position of the scribe mark relative to marks 23 and 24 will indicate the fraction of safe life remaining.

Figures 2, 3:
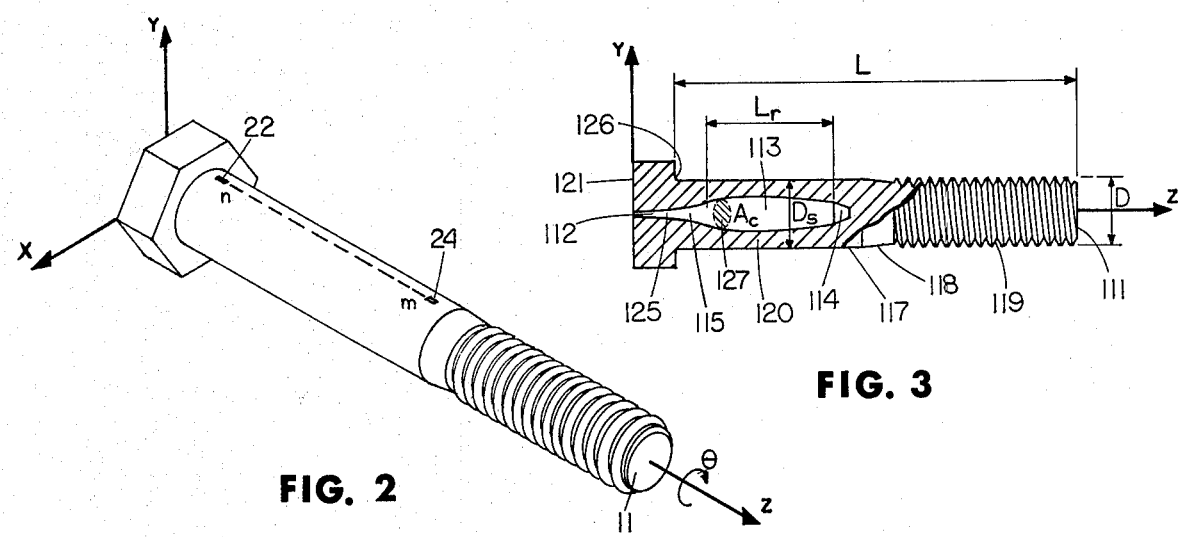
FIG. 2 depicts the Ductbolt of FIG. 1a after the portion of reduced area has undergone permanent twist through an angle $\theta$ as a result of plastic deformation during previous tightening.
FIG. 3 illustrates a Ductbolt wherein the portion of reduced area is of length $L_r$ and lies within the shank component and the reduced area is created by the presence of an open hollow cavity positioned within the head and shank components of the bolt.

The Ductbolt 111 of FIG. 3 has an open hollow cavity 112 positioned symetrically about the axis of the bolt and extending inwardly from the axially transverse end surface of the head component 121 into the shank component 117, with the major volume of the hollow cavity being retained within the shank component 117. The part of the hollow cavity located within the shank component 117 is comprised of a first transition portion 114, a middle portion 113 of axial length $L_r$ communicating axially with the first transition portion 114, and a second transition portion 115 communicating axially with the other end of the middle portion 113. The part of the hollow cavity located within the head component 121 is comprised of a head portion 125 which communicates axially with the other end of the second transition portion 115 and extends axially to the end surface of the head component 121.

The fillet 126 at the junction of the head component 121 and the shank component 117 is designed as in prior art regular bolts to reduce the stress concentration at this junction so as to reduce the possibility of fracture under service conditions, particularly under vibratory loading which imposes fatigue stresses on this junction. To further reduce the possibility of fracture at this junction the axially transverse cross sectional area $A_r$ of the metal in the shank component at this junction is made greater than the stress area $A_s$ of the threads in the threaded component 119, i.e.

$$A_{rjunction} > A_s \qquad (B)$$

Within the middle portion 113 of the hollow cavity the axially transverse cross sectional area $A_c$ of the cavity, designated as 127, is illustrated as varying with axial location. The axial length $L_r$ of the middle portion 113 is the distance between the two axial locations at which the cross sectional area $A_r$ of the metal in the shank component 117 reaches the value $A_r = A_s$. In the shank portion 120 coterminous with the cavity middle portion 113 the axially transverse metal area $A_r$ reaches a minimum value $A_{rmin}$ where $$A_{rmin} < A_s \qquad (C)$$

The maximum axially transverse cross sectional area $A_{cmax}$ of the part of the hollow cavity located within the shank component 117 exists within the middle portion 113 at the axial location where $A_{rmin}$ exists, as is evident by reference to Equation (A).

Calculating $A_{cmax}$ from Equations (A) and (B) and then $A_{cjunction}$ from (A) and (C), and comparing results, shows that $$A_{cmax} > A_{cjunction} \qquad (D)$$

Since the minimum cross sectional area $A_{cmin}$ of the hollow cavity head portion 125 is at least as small as $A_{cjunction}$ it is possible to make the following statement: if a Ductbolt which has an open hollow cavity extending through the head component into the shank component is to fail in the shank component if tightened to failure and is not to fail at the junction of the head and shank components under service conditions, then the cavity's maximum axially transverse cross sectional area $A_{cmax}$ within the shank component must be greater than the cavity's minimum cross sectional area $A_{cmin}$ within the head component.

Figure 4:
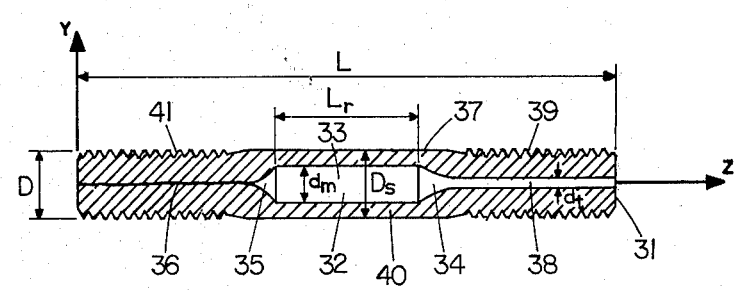
FIG. 4 depicts an axial cross sectional view of a stud wherein the portion of reduced metal area is of axial length $L_r$ and lies within the shank component and the reduced metal area is created by the presence of an open hollow cavity positioned within the shank component and one of the threaded components of the stud.

The stud 31 of FIG. 4 is not intended to represent a preferred embodiment of my invention; rather, it is intended to illustrate alternative possibilities of design. The geometric shape of a stud makes it more difficult to create a hollow cavity in the shank component of a stud than to creat a hollow cavity in the shank component of a bolt.

In FIG. 4 an open hollow cavity 32 is shown extending inwardly from the end surface of the first threaded component 39 into the shank component 37, with the major volume of the cavity being retained within the shank component. A coming-together line 36, substantially following the axis of the stud, is shown extending from the end of the open hollow cavity 32 to the end surface of the second threaded component 41. The part of the hollow cavity located within the shank component is comprised of a first transition portion 35, a middle portion 33 of axial length $L_r$ communicating axially with the first transition portion 35, and a second transition portion 34 communicating axially with the other end of the middle portion 33; the middle portion 33 is shown as being of constant diameter $d_m$ along the axial length $L_r$ and coaxial with the axis of the stud. The part of the hollow cavity located within the first threaded component 39 is comprised of a thread portion 38 which communicates axially with the other end of the second transition portion 34 and extends axially to the end surface of the threaded component; the thread portion 38 is shown as being of constant diameter $d_t$ along its length and coaxial with the stud axis.

If a threaded component has part of a hollow cavity positioned within it, such as the first threaded component 39 in FIG. 4 which has within it the cavity portion 38, then the axially transverse cross sectional area $A_{ct}$ of the thread portion cavity will serve to reduce the strength of the threaded component. As a consequence, the effective stress area $A_{se}$ of the threads in the threaded component will be $$A_{se} = \text{Effective stress area} = A_s - kA_{ctmax} \qquad (E)$$

where $A_{ctmax}$ is the maximum cross sectional area of the hollow cavity within the threaded component, and k is a constant which will have a value in the range of unity but whose actual value will have to be determined experimentally by tensile tests. For a Ductbolt or Ductstud having a threaded component with effective stress area given by Equation (E), the minimum axially transverse metal area $A_{rmin}$ in the shank portion coterminous with the middle portion of the hollow cavity will be subject to the constraint $$A_{rmin} < A_{se} \qquad (F)$$

in order that fracture will occur in the shank component if the fastener is tightened to failure.

From the standpoint of maximum tensile strength (force) it is obvious from Equation (F) that it would be better if a stud could be made with a threaded component such as 41 in FIG. 4 as compared with component 39. Which kind of component will prove to be economically better will depend on cold forming techniques and costs.

Figure 5:
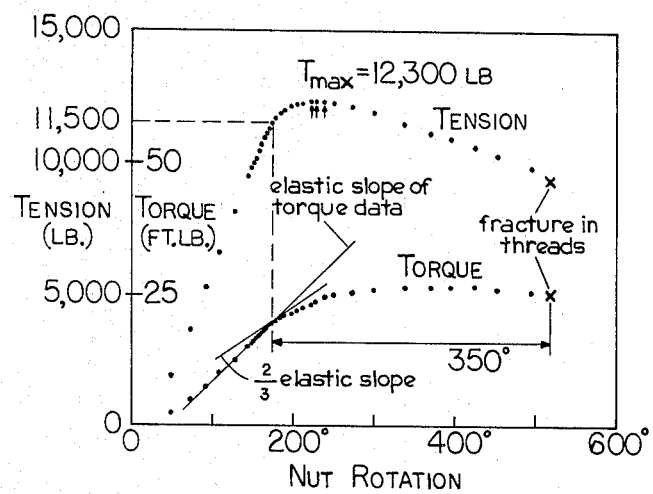

FIG. 5 displays torque and tension data taken in a tightening test of a ⅜in.-16 grade 8 prior art regular bolt for which the length between the bolt head bearing surface and the nut was 2.74 in. The bolt head was held fixed and the nut was rotated with a hand torque wrench which measured the torque. The tension was measured by a Skidmore-Wilhelm tension tester which was clamped by the bolt.

Both the tension data plot and the torque data plot are non-linear at the start of tightening when the bolt is being brought to a 'snug' condition. Following this both plots become linear during the elastic tightening phase and then gradually become non-linear again as the bolt goes from elastic to plastic deformation under the combined effect of the tension and the torque acting on it. The tension plot reaches a maximum, indicated by the vertical arrows, and then drops off until the bolt fractures in the threaded component at just over 500°. The tightening torque continues to rise beyond the point of maximum tension and then drops somewhat before fracture occurs.

In FIG. 5 there is located the point where the slope of the torque-rotation data plot is two-thirds of the elastic slope of this data plot. Presumably this is the point where a continuously monitoring torque-rotation gradient wrenching system would stop tightening. The point is at a nut rotation angle of 175° and the preload tension in the bolt at this angle is 11,500 lb. (At the point where the slope of the tension-rotation data plot is two-thirds of the elastic slope of this data plot the preload tension is 11,200 lb.) The ductility of the bolt, the angle of nut rotation from the beginning of yielding to the point of fracture, is 350°.

Figure 6:
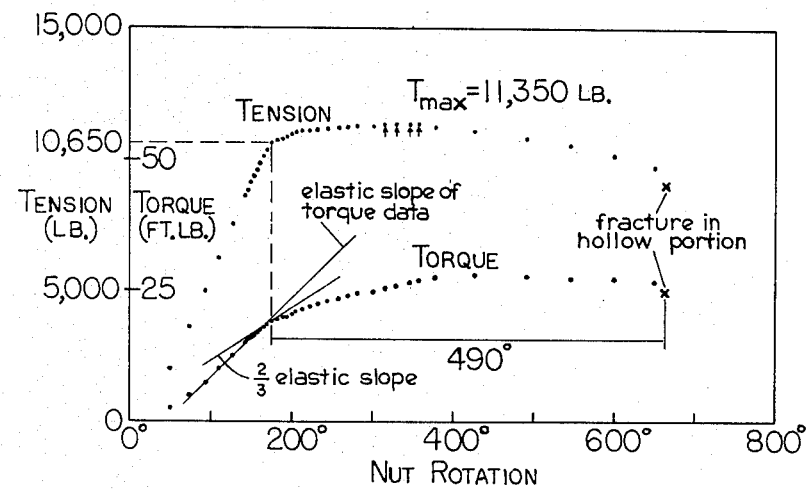
FIG. 6 displays data taken in a similar tightening test of a Ductbolt incorporating a portion of reduced metal area within the shank component wherein the reduced metal area was constant along the axial length $L_r$ and where the Ductbolt was machined from a grade 8 prior art regular bolt of the same manufacture as used for the test reported in FIG. 5.

FIG. 6 displays torque and tension data taken in a similar tightening test of a Ductbolt incorporating the preferred embodiment of reduced portion in which the middle portion of the shank part of the hollow cavity is of constant diameter $d_m$ along the axial length $L_r$. This Ductbolt was machined from a ⅜ in.-16 grade 8 regular bolt of the same manufacture as used for the test reported in FIG. 5. Since this test Ductbolt was not going to be subjected to fatigue loading, fracture at the junction of the head and shank components was not a likely possibility, and therefore to simplify machining the constraint of Equation (B) was ignored for this test bolt and an open hollow cavity of constant diameter $d_m$ was made by drilling inwardly from the end surface of the bolt head. This mode of making the hollow cavity had the effect of eliminating the second transition portion 115 in FIG. 3. Had the hollow cavity been machined with a flat end mill this would have had the additional effect of making the first transition portion 114 to be of zero length.

The shank diameter of the bolt was $D_s = 0.373$ in. and the drilled diameter of the cavity was $d_m = 0.219$ in. so that the cross sectional area of the metal in the reduced portion was $A_r = 0.0716$ in.$^2 = 0.924$ $A_s$ where $A_s$ is the stress area of ⅜ in.-16 threads and has the value of 0.0775 in.$^2$ (see SAE Handbook, SAE Standard J429j, Table 5, op.cit., page 5.05). The length of the reduced portion was $L_r = 0.70$ in. $= 2.6\sqrt{A_r}$.

In the torque-rotation data plot of FIG. 6 a definite drop in slope occurs at the end of the elastic tightening phase at a nut rotation angle of about 175°, and at this angle of rotation the slope changes to a level which is below two-thirds of the elastic slope. This drop in slope is a consequence of the fact that the reduced portion of the Ductbolt has a well defined yield point at this angle of nut rotation, as may be seen from the tension-rotation data plot. A continuously monitoring torque-rotation gradient wrenching system would have no difficulty in sensing this drop in the torque-rotation slope accurately and would stop tightening at this point, leaving the bolt with a preload tension of 10,650 lb.

In this tightening test the tension continues to increase after the yield point and reaches a maximum of 11,350 lb., indicated by the vertical arrows, and then begins to drop off until the bolt fractures in the reduced portion at a nut rotation angle of just over 660°. The ductility of this Ductbolt is 490°, about 1.4 times the ductility of the prior art regular bolt of FIG. 5.

The Ductbolt of FIG. 6 could be redesigned so that it would have a preload tension substantially the same as the 11,500 lb. preload tension produced in the regular bolt of FIG. 5 when it is tightened to yield. For example, if the diameter $d_m$ of the middle portion of the cavity were reduced to $d_m = 0.213$ in. then the area of the metal in the reduced portion would increase to $A_r = 0.0736$ in.$^2 = 0.950 A_s$. This change would increase the level of the preload tension to 10,650 (0.950 $A_s$/0.924 $A_s$) = 10,900 lb. If the hardness of this bolt were made the same (36.0 $R_c$) as that of the regular bolt of FIG. 5 instead of the hardness (34.4 $R_c$) of the Ductbolt of FIG. 6, then from the relationship between hardness and tensile strength (see SAE Handbook, op.cit., SAE Information Report SAE J417b, Hardness Tests and Hardness Number Conversions, Table 4, pages 4.06-4.07) it can be estimated that the preload tension at yield will be about 10,900 (162,000 psi/155,000 psi) = 11,400 lb.

Figure 7:
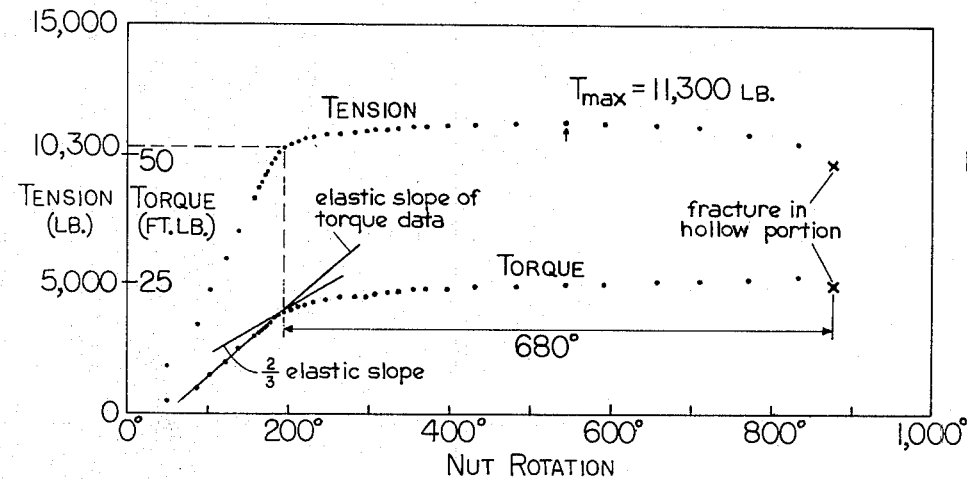
FIG. 7 displays data taken in a similar tightening test of a Ductbolt of the same design as the Ductbolt used for the test reported in FIG. 6 except that the axial length $L_r$ was about 2.4 times the length $L_r$ for the FIG. 6 bolt.

FIG. 7 displays torque and tension data taken in a tightening test of a Ductbolt which was of similar design to the Ductbolt of FIG. 6 except that the axial length $L_r$ of the reduced portion was about 2.4 times the length $L_r$ for the FIG. 6 bolt. The torque and tension behavior is similar to the behavior of the Ductbolt of FIG. 6, the major difference being the increased ductility. The ductility is 680°, about 1.9 times the ductility of the prior art regular bolt of FIG. 5.

Figure 8:
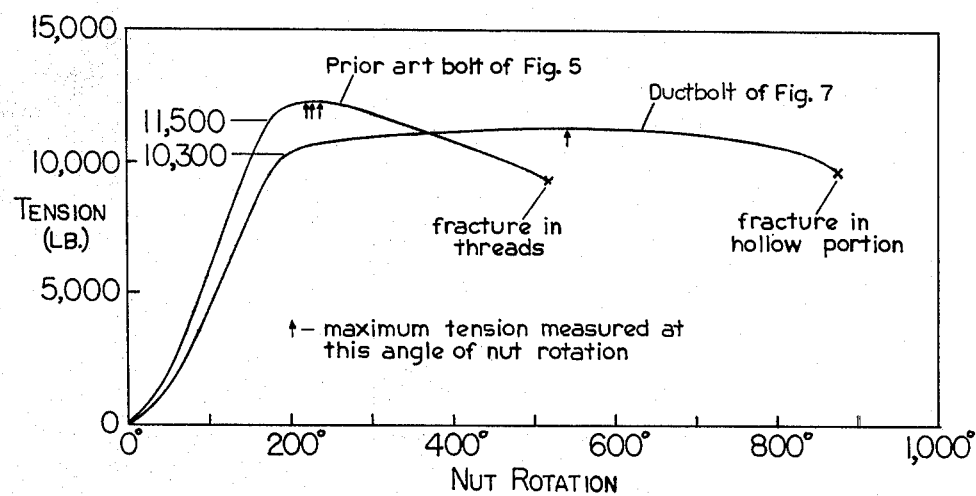
FIG. 8 shows curves representing the tension-rotation data plots displayed in FIGS. 5 and 7.

The curves in FIG. 8 were constructed from the tension-rotation data plots of FIGS. 5 and 7. From this superposition of tension-rotation behaviors the performance advantages of the Ductbolt over the prior art regular bolt are apparent. Most obvious is the well defined yield point of the Ductbolt as contrasted with the gradual onset of plastic deformation in the regular bolt. Because Ductbolts have this well defined yield point the percentage variation in preload tensions in a group of Ductbolts tightened to yield by a continuously monitoring torque-rotation gradient wrenching system will be essentially the same as the percentage variation in the yield point levels in the group of Ductbolts as manufactured.

Another advantage of the Ductbolt is that the nut rotation from yield to the mean angle of the maximum tension data points is about 60° for the regular bolt while for the Ductbolt it is about 350°, a significant added factor of safety for the Ductbolt when tightening to yield with an angle control wrenching system. Also, the preload tensions produced in Ductbolts tightened to yield by an angle control wrenching system will not vary much as a consequence of the use of different specified angles (see discussion above) because the tension in the Ductbolt increases only slowly as the bolt is tightened beyond its yield point.

From the ratio of the angles from yield to maximum tension for the two bolts of FIG. 8 and from the shape of the two tension curves after the point of maximum tension it is clear that another advantage of the Ductbolt is that it can be reused many more times than a regular bolt. This advantage is enhanced by the safeguard provided by the marks on the Ductbolt which tell the user when the reuse life has been exhausted and the bolt should be discarded.

Figure 9:
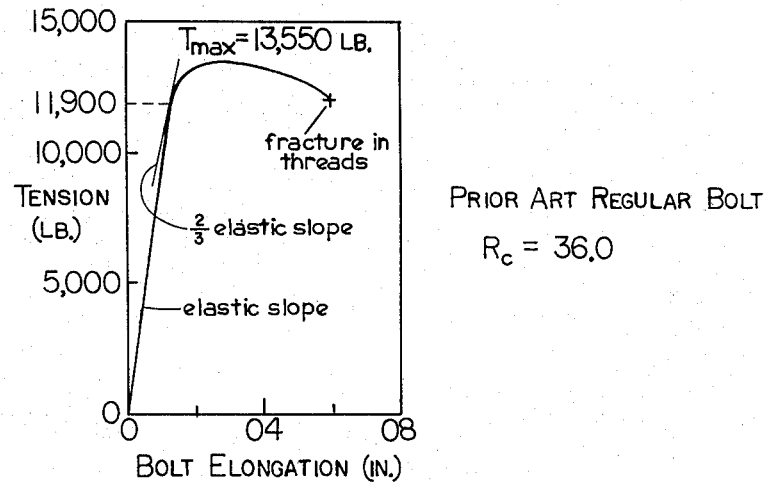
FIGS. 9 and 10 display the data taken in continuous recording tensile tests of bolts similar to those whose tightening behavior is displayed, respectively, in FIGS. 5 and 7.
Figure 10:
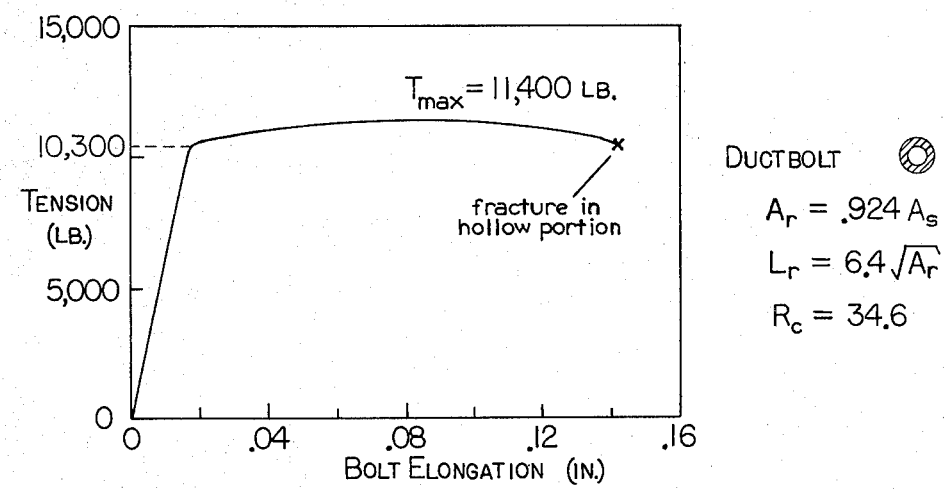

FIGS. 9 and 10 present the data taken in continuous recording tensile tests of a prior art regular bolt and a Ductbolt of the same dimensions as the bolt whose tightening behavior is shown in FIG. 7. The shapes of these tensile test curves are similar to the shapes of the corresponding tension-rotation data plots. However, the tensile test curve for the prior art regular bolt drops off relatively much more rapidly than does the tightening tension-rotation data plot of FIG. 5. This behavior is reflected in the fact that the tensile ductility (plastic elongation from the beginning of yielding to the point of fracture) of the Ductbolt of FIG. 10 is 2.7 times the ductility of the regular bolt of FIG. 9, whereas for the tightening tests of FIG. 7 and FIG. 5 the ratio of ductilities was 1.9. The fact that the regular bolt has relatively better ductility in tightening than in tension loading probably is associated with the spiral geometry of the threads: this spiral geometry would have little influence on the notch stress concentration for axial tensile stress but most likely would reduce the stress concentration for torsional shear stress below that for a similar notch in the form of a circumferential groove around the bolt.

The proof load and tensile strength requirements for ⅜ in.-16 grade 8 bolts (see *SAE Handbook*, SAE Standard J429j, op.cit., Table 5, page 5.05) are that the proof load be 9,300 lb. and that the tensile strength be 11,600 lb. The proof load is the tension the bolt must withstand without permanent set (plastic deformation). The Ductbolt of FIG. 10 exceeds the proof load requirement but falls just short of satisfying the tensile strength requirement of 11,600 lb. The bolt could be redesigned to increase the area of the metal in the reduced portion to $A_r=0.950A_s$ and this would increase the tensile strength to 11,700 lb. If, additionally, the hardness were increased from 34.6 $R_c$ to 36 $R_c$ the tensile strength would be 12,100 lb. If the hardness were increased to the specified maximum allowable level of 39 $R_c$ the tensile strength would increase further to about 13,200 lb.

From a comparison of the behaviors reported in FIGS. 6 and 7 it is apparent that a short Ductbolt will have essentially the same initial plastic elongation behavior characteristics as a long Ductbolt although the longer bolt will have more ductility. The practical significance of this is that short Ductbolts can be tightened to yield with the same ease and accuracy as long Ductbolts. In tightening regular bolts to yield it is more difficult to tighten short bolts satisfactorily.

From FIGS. 8, 9, and 10 it may be seen that the ratio of yield strength (force) to tensile strength (force) for a Ductbolt is higher than that for a prior art regular bolt when the inherent plastic yield behavior of the bolt steel is the same for both bolts. For applications where it is desired that the ratio of yield strength (force) to tensile strength (force) be about that for a prior art regular bolt, such a ratio can be obtained by altering the inherent plastic yield behavior of the Ductbolt steel through choice of steel composition and heat treatment (see *SAE Handbook*, op.cit., SAE Information Report J413a, Mechanical Properties of Heat Treated Steels, FIG. 2, page 3.13).

In order for the Ductbolt to perform its function of pre-empting failure in the threaded component, the axially transverse cross sectional area $A_r$ of the reduced portion must be sufficiently smaller than the stress area $A_s$ of the threads in the threaded component to ensure that failure occurs in the reduced portion. Tightening tests with Ductbolts (machined from high strength prior art regular bolts which were heat treated after forming) with uniform cross sectional area $A_r$ along the length $L_r$ of the reduced portion gave fracture in the reduced portion when the cross sectional area was 0.95 $A_s$ and fracture in the threaded component when the cross sectional area was greater than 0.95 $A_s$. From these experiments it can be concluded that in a Ductbolt design where the metal cross sectional area varies along the length of the reduced portion, as illustrated in FIG. 3, the minimum cross sectional area $A_{rmin}$ has an upper limit of about 0.95 $A_s$.

The tensile strength requirements for fasteners combine with the hardness requirements to impose a lower limit on the minimum cross sectional area $A_{rmin}$. Every fastener of a given grade, size, and thread has to meet specified requirements with respect to minimum tensile strength (stress), minimum tensile strength (force), and minimum and maximum core hardness: see *SAE Handbook*, SAE Standard J429j, op.cit., Table 1, page 5.01, and Table 5, page 5.05, and SAE Standard J1199, op.cit., Table 1, page 5.07, and Table 5, page 5.10. It can be verified from these tables that for a given fastener the specified minimum tensile strength (stress) $\sigma_{tsmin}$ multiplied by the stress area $A_s$ yields the specified minimum tensile strength (force). Also, there is close correlation between hardness and tensile strength, and by reference to *SAE Handbook*, SAE Information Report SAE J417b, Hardness Tests and Hardness Number Conversions, Table 4, pages 4.06–4.07, it can be verified that the specified minimum tensile strength (stress) $\sigma_{tsmin}$ is the tensile strength (stress) corresponding to the specified minimum core hardness. Similarly, one can determine a maximum tensile strength (stress) $\sigma_{tsmax}$ corresponding to the specified maximum allowable core hardness, where $\sigma_{tsmax}$ is the maximum tensile strength (stress) one can anticipate having in a fastener of a given grade and size.

Since $A_{rmin}$ will be less than the stress area $A_s$, the tensile strength (stress) $\sigma_{ts}$ of the metal in the reduced portion of a Ductbolt will have to be higher than the tensile strength (stress) of a prior art regular bolt if both are to have the same tensile strength (force). In particular, if the Ductbolt is to have a tensile strength (force) equal to the specified minimum tensile strength (force) then the following equality must hold:

$$\sigma_{ts}A_{rmin}=\sigma_{tsmin}A_s \quad (G)$$

The larger $\sigma_{ts}$ is made the smaller $A_{rmin}$ can be made. However, the specified maximum on the core hardness imposes a maximum value of $\sigma_{tsmax}$ on the tensile strength (stress) $\sigma_{ts}$ and thus, in order that the Ductbolt have the specified minimum tensile strength (force), the minimum cross sectional area $A_{rmin}$ has a lower limit of $$A_{rmin}=(\sigma_{tsmin}/\sigma_{tsmax})A_s \quad (H)$$

The step from Equation (G) to Equation (H) has inherent in it the assumption that the hardness of the reduced portion will be the same as the hardness of the threaded component. The core hardness of a fastener is measured in the threaded component—see *SAE Handbook*, SAE Standard J429j, op.cit., Paragraph 5.1, page 5.02, and SAE Standard J1216, Test Methods for Metric Threaded Fasteners, Paragraph 3.1, page 5.11. When a Ductbolt is heat treated after forming the hardness in the reduced portion will be substantially the same as the hardness in the threaded component and thus Equation (H) will be valid. As a consequence, for a Ductbolt of a given grade and size which is heat treated after forming the minimum axially transverse cross sectional area $A_{rmin}$ of the reduced portion can range about from $$0.95A_s \text{ to } (\sigma_{tsmin}/\sigma_{tsmax})A_s \quad (I)$$

provided that for any specific $A_{rmin}$ the tensile strength (stress) $\sigma_{ts}$ of the metal in the reduced portion is at least such as to satisfy Equation (G).

When a Ductbolt is not heat treated after forming the hardness of the metal in the reduced portion will be higher than the hardness in the threaded component because of the greater work hardening of the metal in the reduced portion. Core hardness readings taken in all components of prior art regular bolts not heat treated after forming indicate that the greater work hardening of the reduced portion can result in the tensile strength (stress) of the metal in the reduced portion being as much as 20 percent higher than the tensile strength (stress) of the metal in the threaded component. For any particular Ductbolt the exact amount by which the tensile strength (stress) of the metal in the reduced portion will exceed the tensile strength (stress) of the metal in the threaded component will depend on the work hardening properties of the bolt metal and on the particular sequence of cold forming operations used to shape the Ductbolt. Taking 20 percent as a reasonable estimate of this work hardening effect, then for a Ductbolt of a given grade and size which is not heat treated after forming this minimum axially transverse cross sectional area $A_{rmin}$ will have a lower limit of about $$A_{rmin} = (\sigma_{tsmin}/1.20)$$
$$\sigma_{tsmax})A_s = 0.83(\sigma_{tsmin}/\sigma_{tsmax})A_s \quad (J)$$

As a consequence, for a Ductbolt of a given grade and size which is not heat treated after forming the minimum axially transverse cross sectional area $A_{rmin}$ of the metal in the reduced portion can range from about $$0.95 A_s \text{ to } 0.83(\sigma_{tsmin}/\sigma_{tsmax})A_s \quad (K)$$

provided that for any specific $A_{rmin}$ the tensile strength (stress) $\sigma_{ts}$ of the metal in the reduced portion is at least such as to satisfy Equation (G).

Equations (I) and (K) hold when the hollow cavity does not extend into a threaded component. If the hollow cavity extends into a threaded component the stress area $A_s$ in Equations (I) and (K) must be replaced with the effective stress area $A_{se}$ given by Equation (E).

If a Ductbolt is going to fail in the reduced portion then in addition to making $A_{rmin}$ within a certain range it is necessary to make the axial length $L_r$ of the reduced portion of at least a certain length. Tests with various cross sectional metal areas $A_{rmin}$ and lengths $L_r$ established that $L_r$ must be at least about $\sqrt{A_{rmin}}$ in order to assure failure in the reduced portion.

As indicated earlier, significant savings in steel volume are achieved by use of the Ductbolt design. The amount of steel that can be saved depends on the length of reduced portion that can be accommodated. As an example, consider a ⅜ in.-16 grade 8 Ductbolt of overall length L=2 in. If the threaded component is 1 in. long, which is long enough to accomodate the specified minimum thread length (see SAE Handbook, op.cit., SAE Standard J105, page 15.01), then it will be possible to accommodate in the shank component a closed hollow cavity (as illustrated in FIG. 1a) in which the middle portion is of length $L_r=0.70$ in. and the cross sectional area of the metal in the reduced portion is constant along $L_r$ and equal to $A_r=0.0726$ in.$^2=0.937 A_s$. Assuming that the shank diameter of a prior art regular bolt is $D_s=0.372$ in., calculation leads to the result that this Ductbolt will use about 10 percent less steel than a prior art regular bolt of the same length. A similar calculation for a Ductbolt of overall length L=4 in. having a reduced portion for which $L_r=2.70$ in. and $A_r=0.0726$ in.$^2$ leads to a saving of about 20 percent of the steel used to cold form a prior art regular bolt of 4 in. overall length.

For low strength bolts which are not heat treated after forming the work hardening of the reduced portion during cold forming leads to even greater possible savings in steel volume. If it is assumed that a ⅜ inch.-16 grade 1 Ductbolt is manufactured such that the core hardness in the threaded component is the maximum permissible value of 100 $R_b$ then from Equation (K) it may be calculated that the cross sectional area of the metal in the reduced portion may be as small as $A_r=0.0330$ in.$^2=0.426 A_s$. For a Ductbolt of the design of FIG. 1a of overall length L=2 in. for which $A_r=0.0330$ in.$^2$ and $L_r=0.70$ in. the steel saving calculates to be about 21 percent, while for a Ductbolt with overall length L=4 in. with the same $A_r$ and with $L_r=2.7$ in. the calculation leads to a savings of about 43 percent. While the difficulty in maintaining very close control on the maximum core hardness will make it impractical to achieve these very high savings in steel volume, it should be possible to achieve savings of about 15 and 30 percent with, respectively, 2 in. and 4 in. ⅜ in.-16 grade 1 Ductbolts. Although the beginning of yield for low strength Ductbolts is not appreciably better defined than for low strength prior art regular bolts the ductility is about twice as large, and this increased ductility combined with the substantial savings in steel volume give the Ductbolt design distinct commercial advantages over low strength regular bolts.

Although the emphasis thus far has been on tightening to yield, the Ductbolt also can be tightened to produce specified preload tensions in the elastic range which are more accurate and more uniform than those obtained with prior art regular bolts. The tightening process will consist of first tightening the Ductbolt into the plastic range and then untightening it into the elastic range.

When tightening with a continuously monitoring torque-rotation gradient wrenching system the Ductbolt first will be tightened to its well defined yield point. Then, using the threads as micrometer threads, the bolt (or nut) will be rotated in the untightening direction through a specified angle with brings the preload tension down to the specified level in the elastic range. The specified angle will be a function of the combined effective elasticities of the Ductbolt and nut and the joint parts being clamped by the bolt.

When tightening with an angle control wrenching system the Ductbolt first will be tightened to some plastic condition beyond the yield point and then rotated in the untightening direction through a specified angle which brings the preload tension down to the specified level in the elastic range.

Because the external shape of the Ductbolt is substantially the same as the external shape of prior art regular bolts the cold extrusion and cold heading processes used to form regular bolts can be used to form Ductbolts. However, during the forming of the Ductbolt it will be necessary to create a hollow cavity within the bolt, either a closed hollow cavity as illustrated in FIG. 1a or an open hollow cavity as depicted in general form in FIG. 3. The forming of this hollow cavity most likely will require one or more stations in addition to those in machines used for making regular bolts, although some present boltmaking machines might be arranged to form Ductbolts without requiring additional stations.

Creating the design hollow cavity in the Ductbolt by cold forming processes will require first creating an open hollow cavity in the bolt metal and subsequently closing this cavity wholly or partially. The closing of the open cavity can be done most conveniently in the process or processes which create the bolt head, since the forces exerted in heading are the kind of forces needed to close the open cavity.

The original slug of bolt metal can be cold formed into an axially extended shape ready for creating the head by working the original slug with a combination of heading and forward and backward extrusion processes. After these processes the bolt metal should have the following general shape: a first cylindrical part will have a diameter equal to the pitch diameter of the Ductbolt threads and a length equal to the length of the threaded component of the Ductbolt; extending axially from the first cylindrical part will be a second cylindrical part having a diameter equal to the shank diameter $D_s$ of the Ductbolt and a length somewhat less than the length of the shank component of the Ductbolt; extending axially from the other end of the second cylindrical part will be a third generally cylindrical part having a maximum diameter greater than the shank diameter $D_s$ and containing somewhat more metal than will be contained in the formed head of the Ductbolt; and extending axially inwardly from the other end of the third part into the second part will be an open hollow cavity, with that section of the hollow cavity situated within the second part being axially symmetric and having the cross sectional shape and area desired for the middle portion of the hollow cavity in the manufactured Ductbolt. The remainder of the open hollow cavity can be of any shape which is convenient from the standpoint of forming the Ductbolt.

In the operations which transform this axially extended shape into the completely formed Ductbolt ready for thread rolling there should be a combination of heading and forward extrusion so that some of the metal in the third part of the shape is extruded into shank metal of diameter $D_s$ to complete the shank component, and in the process there is created the second transition portion 15 of FIG. 1a or the second transition portion 115 of FIG. 3, depending on whether or not the hollow cavity is to be sealed within the shank component. If the hollow cavity is to be sealed within the head component the second transition portion 115 will communicate with a head portion which is formed such that it decreases to zero area within the head component.

In selecting the metal from which to manufacture the Ductbolt, the forming processes to be employed, and the heat treatment, if any, to be used care must be exercised that the tensile strength (stress) of the metal in the reduced portion of the shank component of the completely manufactured Ductbolt is such that if the Ductbolt is tested to failure in a tensile test the Ductbolt will fail in the reduced portion with a tensile strength (force) at least as large as the specified minimum for the grade, size, and threads of the Ductbolt.

Although socket head cap screws and many other shapes of externally threaded fasteners have not been discussed it is obvious that the principles of my invention can be incorporated in all externally threaded fasteners to produce designs which have the properties of well defined yield point and greatly increased ductility. Also, it is clear that my invention is equally applicable to externally threaded fasteners made of metals other than steel, for example titanium, aluminum, and stainless steel.

Having described my invention, what I now claim is:

1. A metal fastener having a well-defined yield point and improved elongation beyond the yield point and a tensile strength (force) at least as large as the specified minimum for the grade, size, and threads of said metal fastener, the metal fastener of nominal diameter D, which metal fastener comprises in combination: an externally threaded component having threads of nominal diameter D; a circular, cylindrical shank component having a diameter $D_s$ equal to or substantially equal to said nominal diameter D extending axially to one end of the threaded component; and a head component for the application of torque to the fastener extending axially to the other end of the shank component; the fastener being characterized by an axially extending hollow cavity positioned therein within the shank component, and not extending substantially into the threaded component, the axially transverse cross-sectional shape of the cavity being circular in shape at every pont along the cavity and concentric with said cylindrical shank component, the maximum cross-sectional area of the hollow cavity in the shank component being greater than the minimum cross-sectional area within any part of the hollow cavity which extends into the head or threaded components.

2. The fastener of claim 1 wherein the hollow cavity comprises a closed hollow cavity situated substantially within the shank component of the fastener.

3. The fastener of claim 1 wherein the hollow cavity comprises an open hollow cavity extending inwardly from the axially transverse end surface of the head component into the shank component, and wherein the major volume of the cavity is retained within the shank component of the fastener.

4. The fastener of claim 1 wherein that part of the hollow cavity situated within the shank component is characterized by a middle portion of axial length $L_r$, wherein within said middle portion the hollow cavity is generally constant in size along the axial length $L_r$, and wherein the cross-sectional area of the substantially constant hollow cavity in said middle portion is substantially equal to said maximum cross-sectional area of the hollow cavity in the shank component.

5. The fastener of claim 1 wherein that part of the hollow cavity situated within the shank component is comprised of a middle portion of axial length $L_r$ and two transition portions communicating axially with the middle portion, a first transition portion extending towards the threaded component and a second transition portion extending towards the head component, and wherein said transition portions decrease in cross-sectional area as they extend toward the threaded and head components.

6. The fastener of claim 5 wherein the hollow cavity comprises a closed hollow cavity situated substantially within the shank component and wherein said hollow cavity is sealed at its end nearest the head component, said sealing being accomplished during forming of the fastener.

7. The fastener of claim 5 wherein the hollow cavity comprises a closed hollow cavity situated substantially within the shank and head components, and wherein that part of the hollow cavity within the head component is comprised of a head portion, one end of which communicates axially with the head component end of said second transition portion and the other end of which is sealed, said sealing being accomplished during forming of the fastener.

8. The fastener of claim 5 wherein the hollow cavity comprises an open hollow cavity situated substantially within the shank and head components, and wherein that part of the hollow cavity within the head component is comprised of a head portion, one end of which commmunicates axially with the head component end of said second transition portion and the other end of which extends axially to the end surface of the head component.

9. The fastener of claim 1 wherein that part of the hollow cavity situated within the shank component is characterized by a middle portion of axial length $L_r$, and wherein said axial length $L_r$ ranges from about $\sqrt{A_{rmin}}$ to the maximum length that can be accomodated within the shank component, where $A_{rmin}$ is the minimum, axially transverse, cross-sectional area of the metal in the shank portion coterminous with said middle portion of the hollow cavity.

10. The fastener of claim 1 wherein that part of the hollow cavity situated within the shank component is characterized by a middle portion of axial length $L_r$, and wherein the maximum, axially transverse, cross-sectional area $A_{rmax}$ of the metal in the shank portion coterminous with said middle portion of the hollow cavity is not larger than the stress area $A_s$ of the threads of said threaded component.

11. The fastener of claim 1 wherein the fastener is heat treated after forming and that part of the hollow cavity situated within the shank component is characterized by a middle portion of axial length $L_r$, and wherein the minimum, axially transverse, cross-sectional area $A_{rmin}$ of the metal in the shank portion coterminous with said middle portion of the hollow cavity ranges from about 0.95 $A_s$ to $(\sigma_{tsmin}/\sigma_{tsmax})A_s$, where, for the given grade and size of fastener, $\sigma_{tsmin}$ is the specified minimum allowable tensile strength (stress) and $\sigma_{tsmax}$ is the tensile strength (stress) corresponding to the specified maximum allowable core hardness, and where $A_s$ is the stress area of the threads of said threaded component.

12. The fastener of claim 1 wherein the fastener is not heat treated after forming and that part of the hollow cavity situated within the shank component is characterized by a middle portion of axial length $L_r$, and wherein the minimum, axially transverse, cross-sectional area $A_{rmin}$ of the metal in the shank portion coterminous with said middle portion of the hollow cavity ranges from about 0.95 $A_s$ to $0.83(\sigma_{tsmin}/\sigma_{tsmax})A_s$, where, for the given grade and size of fastener, $\sigma_{tsmin}$ is the specified minimum allowable tensile strength (stress) and $\sigma_{tsmax}$ is the tensile strength (stress) corresponding to the specified maximum allowable core hardness, and where $A_s$ is the stress area of the threads of said threaded component.

13. The fastener of claim 1 wherein the axially transverse, cross-sectional area $A_{rjunction}$ of the metal in the shank component at the junction of the head component and the shank component is greater than the stress area $A_s$ of the threads in the threaded component.

14. The fastener of claim 1 which includes marking means such that, if the shank component undergoes permanent twist deformation as a result of tightening of the fastener, a semiquantitative magnitude of the amount of permanent twist deformation will be indicated by said marking means.

15. The fastener of claim 5 which includes marking means such that, if the shank component undergoes permanent twist deformation as a result of tightening of the fastener, the amount of such twist deformation will be indicated by said marking means.

16. The fastener of claim 15 wherein the marking means comprises a means whereby, by visual observation of the means, a semiquantitative magnitude of the amount of permanent twist deformation is visually observed.

17. The fastener of claim 15 wherein the marking means comprises a plurality of generally axially extending marks on the external surface of the shank component.

18. The fastener of claim 17 wherein the marking means comprises first and second bands of marks positioned axially apart and spaced about on the shank component of the the fastener.

19. The fastener of claim 18 wherein the first band of marks is positioned toward the head component and the second band is positioned toward the threaded component on either end of the middle portion of the hollow cavity, and wherein the marks are external, visually observable, circumerentially spaced-about lines on the shank component, whereby comparison of the circumferential positions of the marks on the first and second bands will indicate the magnitude of the permanent twist deformation of the portion of the shank component coterminous with the middle portion of the hollow cavity.

20. A metal fastener having a well-defined yield point and improved elongation beyond the yield point and a tensile strength (force) at least as large as the specified minimum for the grade, size, and threads of said metal fastener, which metal fastener is of nominal diameter D and is heat treated after forming and comprises in combination an externally threaded component having threads of nominal diameter D, a circular cylindrical shank component having a diameter $D_s$ equal to or close to said nominal diameter D received axially to the threaded component, and a head component for the application of torque to the fastener received axially to the other end of the shank component, the fastener being characterized by an axially extending closed hollow cavity positioned therein substantially within said shank component, that part of said hollow cavity located within said shank component being comprised of a middle portion of axial length $L_r$, a first transition portion communicating axially with one end of the middle portion and extending toward the threaded component with decreasing cross sectional area as it extends, and a second transition portion communicating axially with the other end of the middle portion and extending toward the head component with decreasing cross-sectional area as it extends, and wherein within the portion of the shank component coterminous with said middle portion of the hollow cavity;

(a) the axially transverse cross-sectional area of the hollow cavity is substantially constant in shape along said axial length $L_r$ and said shape is generally symmetric about the axis of the fastener;

(b) at every point along said axial length $L_r$ the axially transverse cross-sectional area $A_r$ of the metal in said shank portion is $A_r = (\pi D_s^2/4) - A_c$, where $D_s$ is said diameter of the shank component and $A_c$ is said axially transverse cross-sectional area of the hollow cavity at that point;

(c) the maximum cross-sectional area $A_{rmax}$ of said shank metal is not larger than the stress area $A_s$ of the threads of said threaded component, and the minimum cross-sectional area $A_{rmin}$ of said shank metal ranges from about $0.95A_s$ to $(\sigma_{tsmin}/\pi_{tsmax})A_s$, where, for the given grade and size of fastener, $\sigma_{tsmin}$ is the specified minimum allowable tensile strength (stress) and $\sigma_{tsmax}$ is the tensile strength (stress) corresponding to the specified maximum allowable core hardness; and (d) said axial length $L_r$ ranges from about $\sqrt{A_{rmin}}$ to the maximum length that can be accommodated within the shank component.

21. The fastener of claim 20 which includes a marking means such that, if the shank component undergoes permanent twist deformation as a result of tightening of the fastener, a semiquantitative magnitude of the amount of permanent twist deformation will be indicated visually.

22. A metal fastener having a well-defined yield point and improved elongation beyond the yield point and a tensile strength (force) at least as large as the specified minimum for the grade, size, and threads of said metal fastener, which metal fastener is of nominal diameter D and is not heat treated after forming and comprises in combination an externally threaded component having threads of nominal diameter D, a circular cylindrical shank component having a diameter $D_s$ equal to or close to said nominal diameter D received axially to the threaded component, and a head component for the application of torque to the fastener received axially to the other end of the shank component, the fastener being characterized by an axially extending closed hollow cavity positioned therein substantially within said shank component, that part of said hollow cavity located within said shank component being comprised of a middle portion of axial length $L_r$, a first transition portion communicating axially with one end of the middle portion and extending toward the threaded component with decreasing cross-sectional area as it extends, and a second transition portion communicating axially with the other end of the middle portion and extending toward the head component with decreasing cross-sectional area as it extends, and wherein within the portion of the shank component coterminous with said middle portion of the hollow cavity;

(a) the axially transverse cross-sectional area of the hollow cavity is substantially constant in shape along said axial length $L_r$ and said shape is generally symmetric about the axis of the fastener;

(b) at every point along said axial length $L_r$ the axially transverse cross-sectional area $A_r$ of the metal in said shank portion is $A_r = \pi D_s^2/4 - A_c$, where $D_s$ is said diameter of the shank component and $A_c$ is said axially transverse cross-sectional area of the hollow cavity at that point;

(c) the maximum cross-sectional area $A_{rmax}$ of said shank metal is not larger than the stress area $A_s$ of the threads of said threaded component, and the minimum cross-sectional area $A_{rmin}$ of said shank metal ranges from about $0.95A_s$ to $0.83(\sigma_{tsmin}/\sigma_{tsmax})A_s$, where, for the given grade and size of fastener, $\sigma_{tsmin}$ is the specified minimum allowable tensile strength (stress) and $\sigma_{tsmax}$ is the tensile strength (stress) corresponding to the specified maximum allowable core hardness; and (d) said axial length $L_r$ ranges from about $\sqrt{A_{rmin}}$ to the maximum length that can be accommodated within the shank component.

23. The fastener of claim 22 which includes a marking means such that, if the shank component undergoes permanent twist deformation as a result of tightening of the fastener, a semiquantitative magnitude of the amount of permanent twist deformation will be indicated visually.

24. A metal fastener having a well-defined yield point and improved elongation beyond the yield point and a tensile strength (force) at least as large as the specified minimum for the grade, size, and threads of said metal fastener, which metal fastener is of nominal diameter D and is heat treated after forming and comprises in combination an externally threaded component having threads of nominal diameter D, a circular cylindrical shank component having a diameter $D_s$ equal to or close to said nominal diameter D received axially to the threaded component, and a head component for the application of torque to the fastener received axially to the other end of the shank component, the fastener being characterized by an open hollow cavity extending inwardly from the axially transverse end surface of the head component into the shank component, that part of said hollow cavity located within the shank component being comprised of a middle portion of axial length $L_r$, a first transition portion communicating axially with one end of the middle portion and extending toward the threaded component and decreasing in cross-sectional area as it extends, and a second transition portion communicating axially with the other end of the middle portion and extending to the head component and decreasing in cross-sectional area as it extends, that part of said hollow cavity located within the head component being comprised of a head portion which communicates axially with said second transition portion and extends axially to said end surface of the head component, wherein at the junction of the head component and the shank component the cross-sectional area of the hollow cavity is such that the axially transverse cross-sectional area of the metal in the shank component at this junction is greater than the stress area $A_s$ of the threads in the threaded component, and wherein within the portion of the shank component coterminous with said middle portion of the hollow cavity:

(a) the axially transverse cross-sectional area of the hollow cavity is substantially constant in shape along said axial length $L_r$ and said shape is generally symmetric about the axis of the fastener;

(b) at every point along said axial length $L_r$ the axially transverse cross-sectional area $A_r$ of the metal in said shank portion is $A_r = (\pi D_s^2/4) - A_c$, where $D_s$ is said diameter of the shank component and $A_c$ is the axially transverse cross-sectional area of the hollow cavity at this point;

(c) the maximum cross-sectional area $A_{rmax}$ of said shank metal is not larger than said stress area $A_s$ of the threads of said threaded component, and the minimum cross-sectional area $A_{rmin}$ of said shank metal ranges from about $0.95A_s$ to $(\sigma_{tsmin}/\sigma_{tsmax})A_s$, where, for the given grade and size of fastener, $\sigma_{tsmin}$ is the specified minimum allowable tensile strength (stress) and $\sigma_{tsmax}$ is the tensile strength (stress) corresponding to the specified minimum allowable core hardness; and (d) said axial length $L_r$ ranges from about $\sqrt{A_{rmin}}$ to the maximum length that can be accommodated within the shank component.

25. The fastener of claim 24 which includes a marking means such that, if the shank component undergoes permanent twist deformation as a result of tightening of the fastener, a semiquantitative magnitude of the amount of permament twist deformation will be indicated visually.

26. A metal fastener having a well-defined yield point and improved elongation beyond the yield point and a tensile strength (force) at least as large as the specified minimum for the grade, size, and threads of said metal fastener, which metal fastener is of nominal diameter D and is not heat treated after forming and comprises in combination an externally threaded component having threads of nominal diameter D, a circular cylindrical shank component having a diameter $D_s$ equal to or close to said nominal diameter D received axially to the threaded component, and a head component for the application of torque to the fastener received axially to the other end of the shank component, the fastener being characterized by an open hollow cavity extending inwardly from the axially transverse end surface of the head component into the shank component, that part of said hollow cavity located within the shank component being comprised of a middle portion of axial length $L_r$, a first transition portion communicating axially with one end of the middle portion and extending toward the threaded component and decreasing in cross-sectional area as it extends, and a second transition portion communicating axially with the other end of the middle portion and extending to the head component and decreasing in cross-sectional area as it extends, that part of said hollow cavity located within the head component being comprised of a head portion which communicates axially with said second transition portion and extends axially to said end surface of the head component, wherein at the junction of the head component and the shank component the cross-sectional area of the hollow cavity is such that the axially transverse cross-sectional area of the metal in the shank component at this junction is greater than the stress area $A_s$ of the threads in the threaded component, and wherein within the portion of the shank component coterminous with said middle portion of the hollow cavity:

(a) the axially transverse cross-sectional area of the hollow cavity is substantially constant in shape along said axial length $L_r$ and said shape is generally symmetric about the axis of the fastener;

(b) at every point along said axial length $L_r$ the axially transverse cross-sectional area $A_r$ of the metal in the shank portion is $A_r = (\pi D_s^2/4) - A_c$, where $D_s$ is said diameter of the shank component and $A_c$ is the axially transverse cross-sectional area of the hollow cavity at this point;

(c) the maximum cross-sectional area $A_{rmax}$ of said shank metal is not larger than said stress area $A_s$ of the threads of said threaded component, and the minimum cross-sectional area $A_{rmin}$ of said shank metal ranges from about $0.95 A_s$ to $0.83 \, (\sigma_{tsmin}/\sigma_{tsmax})A_s$, where, for the given grade and size of fastener, $\sigma_{tsmin}$ is the specified minimum allowable tensile strength (stress) and $\sigma_{tsmax}$ is the tensile strength (stress) corresponding to the specified minimum allowable core hardness; and (d) said axial length $L_r$ ranges from about $\sqrt{A_{rmin}}$ to the maximum length that can be accommodated within the shank component.

27. The fastener of claim 26 which includes a marking means such that, if the shank component undergoes permanent twist deformation as a result of tightening of the fastener, a semiquantitative magnitude of the amount of permanent twist deformation will be indicated visually.

28. A metal fastener having a well-defined yield point and improved elongation beyond the yield point and a tensile strength (force) at least as large as the specified minimum for the grade, size, and threads of said metal fastener, the metal fastener of nominal diameter D, which metal fastener comprises in combination:

(a) a first externally threaded component having threads of nominal diameter D;

(b) a circular, cylindrical shank component having a diameter $D_s$ equal to or substantially equal to said nominal diameter D received axially to said first threaded component; and (c) a second externally threaded component having threads of nominal diameter D received axially to the other end of said shank component;

the fastener being characterized by an axially extending hollow cavity positioned therein substantially within the shank component, the axially transverse cross-sectional shape of the cavity being circular in shape at every point along the cavity and concentric with said cylindrical shank component, the maximum cross-sectional area of the hollow cavity in the shank component being greater than the minimum cross-sectional area within any part of the hollow cavity which extends into the first or second threaded components.

29. The fastener of claim 28 wherein the hollow cavity comprises an open hollow cavity and extending inwardly from the axially transverse end surface of one of said first and second threaded components into the shank component, and wherein the major volume of the cavity is retained within the shank component of the fastener.

30. The fastener of claim 28 wherein that part of the hollow cavity situated within the shank component is characterized by a middle portion of axial length $L_r$, wherein within said middle portion the hollow cavity is generally constant in shape along the axial length $L_r$, and wherein the cross-sectional area of the substantially constant hollow cavity in said middle portion is substantially equal to said maximum cross-sectional area of the hollow cavity in the shank component.

31. The fastener of claim 28 wherein that part of the hollow cavity situated within the shank component is generally axially symmetric and further comprises:

(a) a middle portion of axial length $L_r$ and of generally uniform cross-sectional area along its length;

(b) a first transition portion communicating axially with one end of the middle portion and extending toward the first threaded component, and decreasing in cross-sectional area as it extends toward the first threaded component; and (c) a second transition portion communicating axially with the other end of the middle portion and extending toward the second threaded component, and decreasing in cross-sectional area as it extends toward the second threaded component.

32. The fastener of claim 31 wherein said axial length $L_r$ ranges from about $\sqrt{A_{rmin}}$ to the maximum length that that can be accommodated within the shank component, where $A_{rmin}$ is the minimum, axially transverse, cross-sectional area of the metal in the shank portion coterminous with said middle portion of the hollow cavity.

33. A metal fastener having a well-defined yield point and improved elongation beyond the yield point and a tensile strength (force) at least as large as the specified minimum for the grade, size, and threads of said metal fastener, which metal fastener is of nominal diameter D and comprises in combination a first externally threaded component having threads of nominal diameter D, a circular cylindrical shank component having a diameter $D_s$ equal to or substantially equal to said nominal diameter D received axially to the first threaded component, and a second externally threaded component having threads of nominal diameter D received axially to the other end of the shank component, the fastener being characterized by an axially extending, closed hollow cavity positioned therein generally centrally to the axis of the fastener and within the shank component of the fastener, said hollow cavity being comprised of a middle portion of axial length $L_r$, a first transition portion communicating axially with one end of the middle portion and extending toward the first threaded component with decreasing cross-sectional area as it extends, and a second transition portion communicating axially with the other end of the middle portion and extending toward the second threaded component, decreasing in cross-sectional area as it extends, and wherein within the portion of the shank component coterminous with said middle portion of the hollow cavity:

(a) the axially transverse cross-sectional area of the hollow cavity is circular in shape and substantially constant in area along said axial length $L_r$;

(b) at every point along said axial length $L_r$ the axially transverse cross-sectional area $A_r$ of the metal in said shank portion is $A_r = (\pi D_s^2/4) - A_c$, where $D_s$ is said diameter of the shank component and $A_c$ is and substantially constant axially transverse cross-sectional area of the hollow cavity;

(c) the maximum cross-sectional area $A_{rmax}$ of said shank metal is not larger than the stress area $A_s$ of the threads of said first and second threaded components, and the minimum cross-sectional area $A_{rmin}$ of said shank metal ranges from about $0.95 A_s$ to $(\sigma_{tsmin}/\sigma_{tsmax})A_s$, where, for the given grade and size of fastener, $\sigma_{tsmin}$ is the specified minimum allowable tensile strength (stress) and $\sigma_{tsmax}$ is the tensile strength (stress) corresponding to the specified maximum allowable core hardness; and (d) said axial length $L_r$ ranges from about $\sqrt{A_{rmin}}$ to the maximum length that can be accommodated within the shank component.

34. The fastener of claim 33 which includes a marking means such that, if the shank component undergoes permanent twist deformation as a result of tightening of the fastener, a semiquantitative magnitude of the amount of permanent twist deformation will be indicated visually.

35. The fastener of claim 20 wherein within said middle portion the axially transverse cross-sectional shape of the hollow cavity is circular.

36. The fastener of claim 20 wherein within said middle portion the axially transverse cross-sectional area $A_c$ is substantially constant along said axial length $L_r$.

37. The fastener of claim 22 wherein within said middle portion the axially transverse cross-sectional shape of the hollow cavity is circular.

38. The fastener of claim 22 wherein within said middle portion the axially transverse cross-sectional area $A_c$ is substantially constant along said axial length $L_r$.

39. The fastener of claim 24 wherein within said middle portion the axially transverse cross-sectional shape of the hollow cavity is circular.

40. The fastener of claim 24 wherein within said middle portion the axially transverse cross-sectional area $A_c$ is substantially constant along said axial length $L_r$.

41. The fastener of claim 26 wherein within said middle portion the axially transverse cross-sectional shape of the hollow cavity is circular.

42. The fastener of claim 26 wherein within said middle portion the axially transverse cross-sectional area $A_c$ is substantially constant along said axial length $L_r$.

43. A metal fastener having a well-defined yield point and improved elongation beyond the yield point and a tensile strength (force) at least as large as the specified minimum for the grade, size, and threads of said metal fastener, which metal fastener is of nominal diameter D and is heat treated after forming and comprises in combination a first externally threaded component having threads of nominal diameter D, a circular cylindrical shank component having a diameter $D_s$ equal to or substantially equal to said nominal diameter D received axially to the first threaded component, and a second externally threaded component having threads of nominal diameter D received axially to the other end of the shank component, the fastener being characterized by an open hollow cavity extending inwardly from the axially transverse end surface of said first threaded component into the shank component, that part of said hollow cavity located within the shank component being comprised of a middle portion of length $L_r$, a first transition portion communicating axially with one end of the middle portion and extending toward the first threaded component with decreasing cross-sectional area as it extends, and a second transition portion communicating axially with the other end of the middle portion and extending toward the second threaded component with decreasing cross-sectional area as it extends, and wherein that part of the hollow cavity within the first threaded component is comprised of a first threaded portion which communicates axially with the first threaded component end of said first transition portion and the other end of which extends axially to said end surface of the first threaded component, and wherein the effective stress area $A_{se}$ of the threads of the fastener is $A_{se} = A_s - k\ A_{ctmax}$, where $A_s$ is the stress area of the threads of the first threaded component when said component is solid, where $A_{ctmax}$ is the maximum cross-sectional area of said first threaded portion of the hollow cavity, and where k is an experimentally determined constant with a value in the range of unity, and wherein within the portion of the shank component coterminous with said middle portion of the hollow cavity:

(a) the axially transverse cross-sectional area of the hollow cavity is circular in shape and substantially constant in area along said axial length $L_r$;

(b) the axially transverse cross-sectional area $A_r$ of the metal in said shank portion is $A_r = (\pi D_s^2/4) - A_c$, where $D_s$ is said diameter of the shank component and $A_c$ is the substantially constant axially transverse cross-sectional area of the hollow cavity;

(c) the cross-sectional area $A_r$ of said shank metal ranges from about $0.95 A_{se}$ to $(\sigma_{tsmin}/\sigma_{tsmax})A_{se}$, where, for the given grade and size of fastener, $\sigma_{tsmin}$ is the specified minimum allowable tensile strength (stress) and $\sigma_{tsmax}$ is the tensile strength (stress) corresponding to the specified maximum allowable core hardness; and (d) said axial length $L_r$ ranges from about $\sqrt{A_r}$ to the maximum length that can be accommodated within the shank component.

44. The fastener of claim 43 which includes a marking means such that, if the shank component undergoes permanent twist deformation as a result of tightening of the fastener, a semiquantitative magnitude of the amount of permanent twist deformation will be indicated visually.

45. A metal fastener having a well-defined yield point and improved elongation beyond the yield point and a tensile strength (force) at least as large as the specified minimum for the grade, size, and threads of said metal fastener, which metal fastener is of nominal diameter D and is heat treated after forming and comprises in combination a first externally threaded component having threads of nominal diameter D, a circular cylindrical shank component having a diameter $D_s$ equal to or substantially equal to said nominal diameter D received axially to the first threaded component, and a second externally threaded component having threads of nominal diameter D received axially to the other end of the shank component, the fastener being characterized by an open hollow cavity extending axially throughout the fastener from the axially transverse end surface of said first threaded component to the axially transverse end surface of said second threaded component, that part of said hollow cavity located within the shank component being comprised of a middle portion of length $L_r$, a first transition portion communicating axially with one end of the middle portion and extending toward the first threaded component with decreasing cross-sectional area as it extends, and a second transition portion communicating axially with the other end of the middle portion and extending toward the second threaded component with decreasing cross-sectional area as it extends, and wherein that portion of the hollow cavity within the first threaded component is comprised of a first threaded portion, one end of which communicates axially with the first threaded component end of said first transition portion and the other end of which extends axially to said end surface of the first threaded component, and wherein that portion of the hollow cavity within the second threaded component is comprised of a second threaded portion, one end of which communicates axially with the second threaded component end of said second transition portion and the other end of which extends axially to said end surface of the second threaded component, and wherein the effective stress area $A_{se}$ of the threads of the fastener is $A_{se} = A_s - k\, A_{ctmax}$, where $A_s$ is the stress area of the threaded components when said components are solid, $A_{ctmax}$ is the maximum cross-sectional area of said hollow cavity in either the first threaded portion or the second threaded portion, whichever is greater, and k is an experimentally determined constant with a value in the range of unity, and wherein within the portion of the shank component coterminous with said middle portion of the hollow cavity:

(a) the axially transverse cross-sectional area of the hollow cavity is circular in shape and substantially constant in area along said axial length $L_r$;

(b) the axially transverse cross-sectional area $A_r$ of the metal in said shank component is $A_r = (\pi D_s^2/4) - A_c$, where $D_s$ is said diameter of the shank component and $A_c$ is the substantially constant axially transverse cross-sectional area of the hollow cavity;

(c) the cross-sectional area $A_r$ of said shank metal ranges from about $0.95 A_{se}$ to $(\sigma_{tsmin}/\sigma_{tsmax}) A_{se}$, where, for the given grade and size of fastener, $\sigma_{tsmin}$ is the specified minimum allowable tensile strength (stress) and $\sigma_{tsmax}$ is the tensile strength (stress) corresponding to the specified maximum allowable core hardness; and (d) said axial length $L_r$ ranges from about $\sqrt{L_r}$ to the maximum length that can be accommodated within the shank component.

46. The fastener of claim 45 which includes a marking means such that, if the shank component undergoes permanent twist deformation as a result of tightening of the fastener, a semiquantitative magnitude of the amount of permanent twist deformation will be indicated visually.

* * * * *

UNITED STATES PATENT AND TRADEMARK OFFICE
CERTIFICATE OF CORRECTION

PATENT NO. : 4,348,141
DATED : September 7, 1982
INVENTOR(S) : Norman C. Dahl

It is certified that error appears in the above-identified patent and that said Letters Patent are hereby corrected as shown below:

Column 21, claim 20, line 7, delete "$\pi$" and insert therefor --$\sigma$--.

Column 22, claim 22, line 1, delete "$\sqrt{A_{rmin}}$" and insert therefor --$\sqrt{A_{rmin}}$--.

Column 25, claim 35, line 60, delete "20" and insert therefor --26--; claim 36, line 63, delete "20" and insert therefor --26--; and claim 37, line 66, delete "22" and insert therefor --20--.

UNITED STATES PATENT AND TRADEMARK OFFICE
CERTIFICATE OF CORRECTION

PATENT NO. : 4,348,141

DATED : September 7, 1982

INVENTOR(S) : Norman C. Dahl

It is certified that error appears in the above-identified patent and that said Letters Patent is hereby corrected as shown below:

Column 26, claim 38, line 1, delete "22" and insert therefor --20--; claim 39, line 4, delete "24" and insert therefor --22--; claim 40, line 7, delete "24" and insert therefor --22--; claim 41, line 10, delete "26" and insert therefor --24--; claim 42, line 13, delete "26" and insert therefor --24--.

Signed and Sealed this

Fourth Day of September 1984

[SEAL]

Attest:

Attesting Officer

GERALD J. MOSSINGHOFF

Commissioner of Patents and Trademarks